Jan. 6, 1953  D. T. LANG  2,624,332
HEATING DEVICE
Filed June 1, 1951
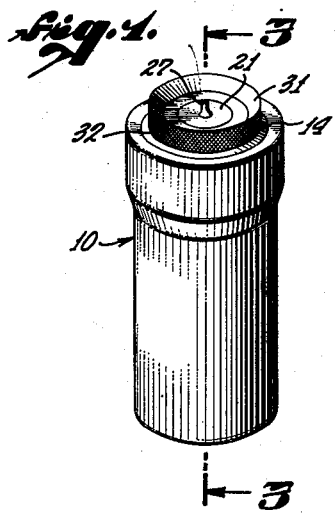
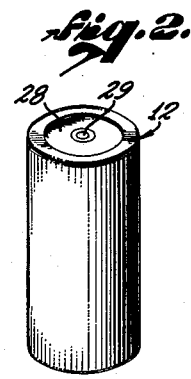
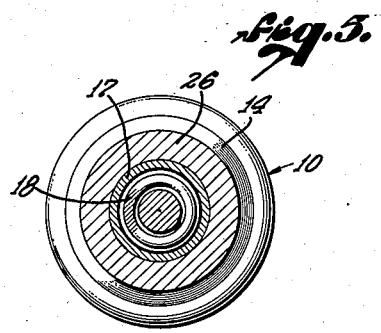
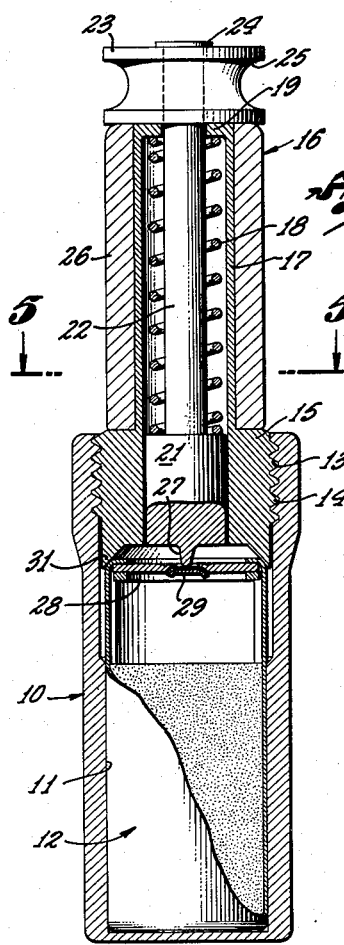
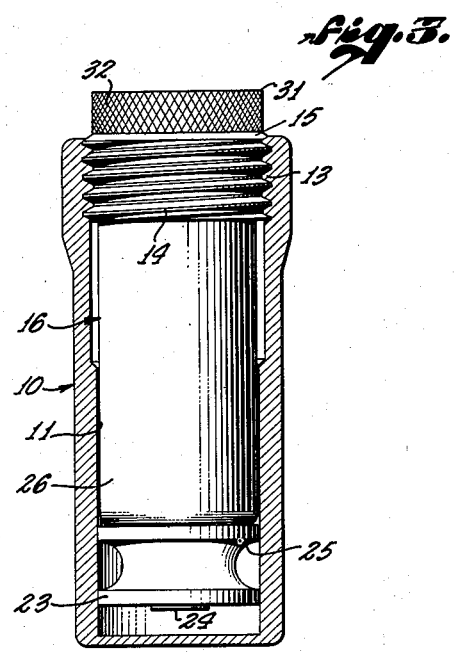
DELMER T. LANG,
INVENTOR.
BY *George V. Smyth*
ATTORNEY.

Patented Jan. 6, 1953

2,624,332

UNITED STATES PATENT OFFICE 2,624,332

HEATING DEVICE

Delmer T. Lang, Palos Verdes Estates, Calif.

Application June 1, 1951, Serial No. 229,339

3 Claims. (Cl. 126—263)

This invention relates to heating devices and more particularly to a portable device employing an autogenous heating cartridge.

The device of the present invention is particularly useful for heating fluids as it is most efficient as an immersion type heating device. It is now believed that the device will find its principal use as a device for heating fluids in fields where other heat sources are either not available or are not practicable. However, as the device is compact, easy to use, and requires no extraneous igniting means, it can be used in any field where a limited supply of heat energy is required.

The device of the present invention in the broadest aspects thereof comprises a receptacle for holding an autogenous heat cartridge having a percussion primer for igniting a combustible charge held thereby. A handle element includes a means for applying a percussive force to the primer for igniting the charge. The handle element is detachable from the receptacle and a feature of the present invention resides in the fact that the handle element may be stored within the receptacle and held against removal therefrom by the same means used to secure the handle element in operative position to the receptacle. This feature simplifies storage of the device in that its over all size can be materially decreased whenever the device is not in use.

Other features and advantages of the device of the present invention will be apparent from the following detailed description taken in connection with the accompanying drawing, in which:

Figure 1 is a perspective view of the device shown in its storage position;

Figure 2 is a perspective view of the heating cartridge to be used with the device;

Figure 3 is a sectional view taken along line 3—3 of Figure 1;

Figure 4 is a sectional view of the device with a heating cartridge in place within the receptacle; and Figure 5 is a view taken along line 5—5 of Figure 4.

The device of the present invention, referring now to the drawing and more particularly to Figure 4 thereof, comprises a body member in the form of a receptacle 10, open at one end, and presenting an internal cylindrical wall surface 11 defining a chamber for receiving a cylindrical autogenous heating cartridge 12. It will be noted that the wall surface 11 closely engages the outer cylindrical surface of the cartridge throughout a great extent of the length of the cartridge. This is to reduce to a minimum the annular space between the cartridge and the wall surface and thus reduce heat transfer losses between the contiguous surfaces.

To facilitate insertion of a cartridge in the receptacle 10, the open end of the chamber thereof is enlarged as clearly shown in Figure 4. The enlarged bore of the receptacle is formed adjacent the open end thereof with screw threads 13 adapted to engage with external threads 14 carried by a boss 15 forming a part of a demountable handle element 16 for the heater element formed by the receptacle. The boss 15 is formed as an integral part of a tubular element or sleeve 17 housing or enclosing a coiled spring 18 seating at the one end thereof on an annular inturned flange 19 of the sleeve 17. The opposite end of the spring 18 engages and acts against a plug 21 slidably mounted in a bore coaxially formed in the boss 15 as a continuation of the bore of the sleeve 17. A rod 22 longitudinally extending from the plug 21 coaxially passes through the sleeve 17 and carries at its free end a knob element 23. The rod may be formed as an integral part of the plug or may be separately formed and fixed to the plug by any means desired. The knob 23 is held against removal from the rod 22 by peening over the free end of the rod 22 as indicated at 24.

The spring 18 will normally hold the plug 21 in the position shown in Figure 4, with the knob 23 held in engagement with the outer surface of the annular inturned flange 19. The spring, however, will permit the plug 21 to move upwardly, as viewed in Figure 4, whenever a force is applied to the knob 23 in a direction tending to move the knob 23 away from and out of engagement with the annular inturned flange 19. To facilitate this action, the actuator knob 23, in the illustrated embodiment of the invention, is formed with an annular groove 25 to permit the fingers of the user to more readily grasp the knob 23 to apply a force to the knob and move tht same outwardly of the sleeve 17.

In the now preferred embodiment of the invention the sleeve 17 is telescopically fitted within a tubular member 26 formed with a relatively thick wall. The material of which the tubular member 26 may be formed is of no significance except that it should have very poor heat conductivity for it is intended to serve as the element to be grasped by the fingers during use of the device.

The plug 21 carries on its exposed face a longitudinally projecting pin 27 by which a percussive force may be applied to the percussion primer of the heating cartridge 12. The heating cartridge, referring again to Figure 4, comprises a cylindrical casing holding an ignitable composition which, when ignited, liberates a large amount of heat rapidly. The casing is hermetically sealed by a closure member 28 that is provided centrally with a percussion primer or cap 29. Any conventional means may be used to hermetically seal the joint between the casing and the closure member 28, although in the illustrated embodiment of the invention this has been effected by spinning or otherwise forcing the wall of the casing at the open end thereof over the closure member which is held in position by an annular internal shoulder formed on the inner wall of the casing adjacent the open end thereof.

The ignitable charge held by the cartridge should not completely fill the same, so as to leave within the cartridge a chamber for expansion of air during the ignition of the combustible charge and for receiving such gases as might be generated during combustion of the charge. The particular charge to be held by the cartridge is not important except that it preferably should be one which will generate a relatively large amount of heat rapidly without production of a substantial amount of combustion products which might rupture the hermetic seal of the casing during combustion of the charge.

When it is desired to use the device of the present invention to rapidly heat a confined fluid, a heating cartridge is inserted into the receptacle after which the handle element 16 is mounted to the receptacle by engaging the threads 14 of the boss 15 with the threads 13 internally formed at the open end of the receptacle. After the handle member has been turned or rotated to longitudinally draw the pin 27 into snug engagement with the percussion primer 29, the knob 23 is grasped by the user and pulled back to retract the plug 21 and the pin 27 carried thereby. Upon release of the knob 23, the spring 18 will quickly snap the plug 21 to its normal position and force the pin 27 into percussive engagement with the primer 29 to thereby bring about ignition of the combustible charge held by the cartridge.

As best seen in Figure 4, the free end face of the boss 15 is recessed to provide an annular flange or skirt 31 which circumscribes the end of the cartride carrying the percussive primer. The conical inner face of this skirt forms a means engageable with the peripheral edge of the cartride and operable to center the cartridge as the handle element is threaded into the receptable.

After the combustible charge has been ignited, the device may now be submerged into the fluid to be heated by the user grasping the tubular member 26 which, it will be remembered, is formed of a material having a low thermal conductivity. As the wall surface 11 very closely engages the outer cylindrical surface of the cartridge, there is a rapid heat transfer to the wall of the receptacle 10 which preferably should be formed of a material having a relatively high thermal conductivity such as aluminum magnesium or alloys thereof.

It might be mentioned here that the wall surface 11 is of a length approximately equal to the depth of the ignitable charge of the cartridge. This insures maximum heat transfer without rendering insertion of a cartridge difficult because of the close tolerance.

After the heat energy generated by the ignited charge has been spent, the receptacle is merely withdrawn from the now heated fluid, which can be used for its intended purpose. As the combustible charge is hermetically sealed within the cartridge, there is obviously no contamination of the fluid heated by the ignitable charge or products of combustion generated during ignition of the charge. This feature of the device also renders it extremely safe in use as there is no likelihood of the user being injured by the charge during the combustion thereof.

The diameter of the knob 23 is substantially equal to the outer diameter of the tubular member 26, which is less than the inner diameter of the wall surface 11. This permits the handle element to be telescopically inserted within the receptacle 10 when it is desired to store the device of the present invention.

It will be seen, referring now to Figure 3, that when the device is not in use the handle element 16 can be nested within the receptacle by reversing the handle as shown in the figure above referred to. The cooperating threads 13 and 14 can be engaged, by relative rotation between the parts, to snugly hold the handle element in its stored position within the receptacle. To facilitate this rotation, the outer surface of the boss 15 adjacent the one end thereof is knurled as indicated at 32. The storage of the handle element within the receptacle when the device is not in use simplifies storage and packing of the device for obviously its over all length is considerably reduced.

The threads are so formed that the knurled portion 32 of the boss 15 is held out of the receptacle after the handle element has been threaded into the receptacle. Thus, this surface is always available to a user when he wishes to remove the handle element to mount the same in operative position as shown in Figure 4.

It will now be seen that the device of the present invention provides an efficient and very compact heater for use in any field where a limited quantum of heat energy is required. The device is particularly adapted as an immersion type unit for heating a liquid and as such is especially useful to campers, fishermen, and hunters for heating water for coffee, tea or other culinary liquids such as soups or the like. As the device will rapidly produce a relatively high temperature heat without light, it is well adapted for use by combat troops who for security reasons cannot use a fire for heating rations in the field.

Furthermore, as the device can be, in effect, collapsed for storage, it can be easily carried by the user by merely slipping the same into a pocket of his clothing or a special pouch or the like attached to his clothing. In this connection it should be noted that the pin 27 is disposed within the recess of the boss 15 and is thus protected by the skirt 31 when the handle element is nested within the body member or receptacle. This not only obviates the danger of the pin being damaged, but also protects the body or hands of the user from being injured by contact with the pin.

Although the now preferred embodiment of the present invention has been shown and described herein, it is to be understood that the invention is not to be limited thereto, for it is susceptible to changes in form and detail within the scope of the appended claims.

I claim:

1. A device of the type described, comprising: a receptacle presenting a chamber open at one end for receiving and holding an autogenous heating cartridge having a percussion primer for igniting a combustible charge held thereby, the wall of said chamber being formed with threads adjacent the open end thereof; a handle element having external threads adjacent one end thereof for engagement with the internal threads of said receptacle for coaxially mounting said handle element to said receptacle; a pin slidably carried by said handle element; resilient means for normally holding said pin in an extended position; an actuator knob; means connecting said knob to said pin, said knob adapted for hand engagement to retract said pin within said handle element whereby when said knob is released said resilient means quickly returns said pin to its normal position to exert a percussive force on said primer to thereby ignite said combustible charge, said handle element, after removal of a spent cartridge, being telescopically mountable within said receptacle and held therein by engagement of the external threads thereof with the internal threads of said receptacle.

2. A device of the type described, comprising: a receptacle presenting a chamber open at one end for receiving and holding an autogenous heating cartridge having a percussion primer for igniting a combustible charge held thereby, the wall of said chamber being formed with threads adjacent the open end thereof; a tubular element having external threads adjacent one end thereof for engagement with the internal threads of said receptacle for coaxially mounting said element to said receptacle; a pin telescopically mounted within said element and movable relative thereto; resilient means for normally holding said pin in an extended position; an actuator knob; means connecting said knob to said pin, said knob adapted for hand engagement to retract said pin within said tubular element whereby when said knob is released said resilient means quickly returns said pin to its normal position to exert percussive force on said primer to thereby ignite said combustible charge; a sleeve of a material of low thermal conductivity circumscribing said tubular element and forming therewith a handle member; said handle member, after removal of a spent cartridge, being telescopically mountable within said receptacle and held therein by engagement of the external threads thereof with the internal threads of said receptacle.

3. A device of the type described, comprising: a receptacle presenting a chamber open at one end for receiving and holding an autogenous heating cartridge having a percussion primer for igniting a combustible charge held thereby, the wall of said chamber being formed with threads adjacent the open end thereof; and a handle element comprising an annular, externally threaded boss for engagement with the internal threads of said receptacle for coaxially mounting said handle element to said receptacle, a tubular member longitudinally projecting from one face of said boss with the bore thereof as continuation of the bore of said boss, an inturned flange formed at the free end of said member, a rod, a plug fixed to one end of said rod mounted for sliding movement in said aligned bores, a pin projecting from the free face of said plug, a spring sleeving said rod and compressed between said flange and said plug, a knob fixed to the free end of said rod, and a sleeve of thermal insulating material circumscribing said tubular member, said actuator knob adapted for hand engagement to retract said plug within said handle element whereby when said knob is released said spring quickly returns said plug to its normal position to percussively force said pin on said primer to thereby ignite said combustible charge, said handle element, after removal of a spent cartridge, being telescopically mountable within said receptacle and held therein by engagement of the external threads thereof with the internal threads of said receptacle.

DELMER T. LANG.

REFERENCES CITED

The following references are of record in the file of this patent:

UNITED STATES PATENTS

| Number | Name | Date |
|---|---|---|
| 1,573,872 | Schwartz | Feb. 23, 1926 |
| 2,020,292 | Eggert et al. | Nov. 12, 1935 |
| 2,276,766 | De Witt | Mar. 17, 1942 |
| 2,388,466 | Caldwell | Nov. 6, 1945 |
| 2,452,597 | Olsen | Nov. 2, 1948 |
| 2,512,284 | Mumford | June 20, 1950 |
| 2,531,548 | Bennett | Nov. 28, 1950 |